United States Patent
Kling et al.

(10) Patent No.: US 12,050,103 B2
(45) Date of Patent: Jul. 30, 2024

(54) ROTATIONAL ANGLE SENSOR DEVICE AND METHOD FOR DETERMINING A ROTATIONAL ANGLE, AND CONTROL DEVICE FOR AN ELECTRIC MOTOR

(71) Applicant: Infineon Technologies AG, Neubiberg (DE)

(72) Inventors: Rainer Kling, Munich (DE); Stephan Leisenheimer, Deisenhofen (DE); Severin Neuner, Valley (DE); Monika Pfeifer, Unterhaching (DE); Dragos Vocurek, Bucharest (RO); Hans-Joerg Wagner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 267 days.

(21) Appl. No.: 17/653,671

(22) Filed: Mar. 7, 2022

(65) Prior Publication Data

US 2022/0290968 A1    Sep. 15, 2022

(30) Foreign Application Priority Data

Mar. 11, 2021   (DE) .......................... 102021105880.5

(51) Int. Cl.
*H02P 23/14* (2006.01)
*G01B 7/30* (2006.01)
*G01D 5/14* (2006.01)

(52) U.S. Cl.
CPC .............. *G01B 7/30* (2013.01); *G01D 5/145* (2013.01); *H02P 23/14* (2013.01)

(58) Field of Classification Search
CPC ................................. G01D 5/145; H02P 23/14
See application file for complete search history.

(56) References Cited

U.S. PATENT DOCUMENTS

| | | | |
|---|---|---|---|
| 6,229,299 B1* | 5/2001 | Strashny | G01P 3/487 340/672 |
| 9,989,384 B2* | 6/2018 | Scotson | G01D 5/243 |
| 2004/0135077 A1 | 7/2004 | Hane | |
| 2005/0030012 A1* | 2/2005 | Kunz-Vizenetz | G01D 5/145 324/207.25 |
| 2005/0127762 A1 | 6/2005 | Miyashita et al. | |
| 2007/0093980 A1* | 4/2007 | Stek | G01D 5/2448 702/89 |
| 2007/0189421 A1* | 8/2007 | Taniguchi | G01D 5/2448 375/332 |
| 2009/0102460 A1* | 4/2009 | Schott | G01D 5/244 324/207.2 |
| 2012/0182009 A1 | 7/2012 | Ueda | |
| 2015/0295525 A1 | 10/2015 | Liu et al. | |
| 2020/0081073 A1 | 3/2020 | Richards | |

FOREIGN PATENT DOCUMENTS

| | | |
|---|---|---|
| EP | 2309231 A2 | 4/2011 |
| JP | 09-113255 A | 5/1997 |

* cited by examiner

*Primary Examiner* — Rina I Duda
(74) *Attorney, Agent, or Firm* — Harrity & Harrity, LLP (57) ABSTRACT

A rotational angle sensor device and a corresponding method are provided. Two signals which have a phase offset with respect to one another are generated based on a modulated magnetic field using a sensor arrangement. Three signals which have a phase offset with respect to one another are generated from the signals.

19 Claims, 7 Drawing Sheets

ROTATIONAL ANGLE SENSOR DEVICE AND METHOD FOR DETERMINING A ROTATIONAL ANGLE, AND CONTROL DEVICE FOR AN ELECTRIC MOTOR

CROSS REFERENCE TO RELATED APPLICATION

This application claims priority to German Patent Application No. 102021105880.5 filed on Mar. 11, 2021, the content of which is incorporated by reference herein in its entirety.

TECHNICAL FIELD

The present application relates to a rotational angle sensor device and to a method for determining a rotational angle and to a device for controlling an electric motor.

BACKGROUND

Rotational angle sensor devices are used to measure the rotational angle of a shaft, of a rotor or of another rotatable element. This can be used, for example, to control an electric motor, for example a brushless DC motor (BLDC) in which switches for commutating a current through coils of the motor are switched based on the rotational angle.

SUMMARY

A rotational angle sensor device, a method and a device according to independent claims are provided. The subclaims define further implementations and a device having such a rotational angle sensor device and an electric motor.

One implementation provides a rotational angle sensor device comprising:

a sensor arrangement which is configured to capture a modulated magnetic field and, based on the captured modulated magnetic field, to output two first signals which have a phase offset with respect to one another, and a calculation apparatus which is configured to generate at least three second signals which have a phase offset with respect to one another based on the two first signals which have a phase offset.

Another implementation provides a method comprising:

capturing a modulated magnetic field for the purpose of generating two first signals which have a phase offset with respect to one another, and generating three second signals which have a phase offset with respect to one another based on the first signals.

A further implementation provides a device for controlling an electric motor, comprising:

a calculation apparatus which is configured to generate at least three second signals which have a phase offset with respect to one another based on two first signals which have a phase offset with respect to one another and are based on a magnetic field modulated by rotation of the electric motor, wherein the device is configured to control the electric motor based on zero crossings or edge changes of the at least three second signals.

The above summary is used merely as an overview and should not be interpreted as being restrictive since other example implementations may have other features.

DETAILED DESCRIPTION

Various example implementations are explained in detail below. These example implementations are used merely for illustration and should not be interpreted as being restrictive. A description of an example implementation having a multiplicity of features (for example components, elements, method steps, processes and the like) therefore does not mean that all of these features are necessary for implementation. Rather, in other example implementations, some features may be omitted or replaced with alternative features. In addition to the features explicitly described, further features, for example features used in conventional rotational angle sensor devices, may be used.

Magnetic field sensors are used to measure the rotational angle in many applications. In this case, a rotation generates a temporally modulated magnetic field which is measured. For example, magnets such as permanent magnets, which generate a variable magnetic field during rotation, may be arranged on a rotating element, for example a rotor of an electric motor. This magnetic field is then measured. In other applications, a gearwheel made of ferromagnetic material, which during rotation modulates a magnetic field generated by a stationary magnet which may be arranged close to a magnetic field sensor, is arranged on the rotating element, for example. This modulation can also be measured by appropriate magnetic field sensors.

Electric motors are often in the form of three-phase motors or multi-phase motors in which the commutation is carried out in three or more different operating phases. For such applications, three magnetic field sensors are then conventionally arranged at spacings of 120° around the axis of rotation of the rotor in order to provide three signals which have a phase offset of 120° and based on which the motor is then controlled. These sensors must then be arranged precisely, and the provision of installation locations for three sensors and their installation involve a certain amount of effort.

Various example implementations relate to rotational angle sensor devices and corresponding methods in which a magnetic field is captured using magnetic field sensors.

Magnetic field sensors may be, for example, Hall sensors which measure a magnetic field based on the Hall effect. Such Hall sensors can be operated using a spinning current technique in which connections for applying a measurement current and connections for tapping off a Hall voltage are periodically interchanged in order to reduce an offset. In other example implementations, it is possible to use magnetoresistive sensors which measure a magnetic field based on magnetoresistive effects such as giant magnetoresistance (GMR), anisotropic magnetoresistance (AMR) or tunneling magnetoresistance (TMR). These types of magnetic field sensors are also referred to in combination as XMR sensors. Both Hall sensors and XMR sensors have the property that they are only sensitive to magnetic field components in certain directions. For example, Hall sensors are sensitive to magnetic fields perpendicular to a surface of the Hall sensor, and XMR sensors are sensitive to magnetic field components in a direction which is predefined by a reference magnetization of a reference layer of the sensor. In some example implementations, this sensitivity is utilized by using magnetic field sensors which are sensitive to different directions of the magnetic field, also referred to here as different components of the magnetic field, in order to thus generate signals which have a phase offset.

Signals which are illustrated in the following figures should be understood merely as an example since the waveforms of signals may depend on the respective implementation. In particular, signals may also have a certain amount of noise, which is unavoidable in real systems. This noise and other interfering influences are not illustrated in the example signals.

Figure 1:
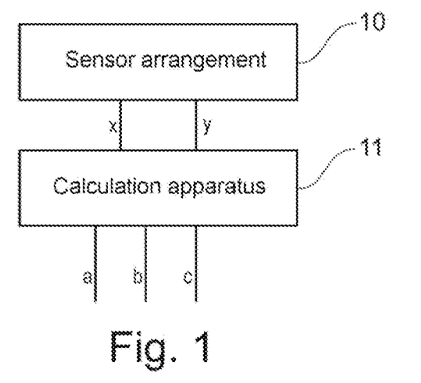
FIG. 1 is a block diagram of a rotational angle sensor device according to one example implementation.

FIG. 1 shows a rotational angle sensor device according to some implementations. The rotational angle sensor device in FIG. 1 comprises a sensor arrangement 10 and a calculation apparatus 11. The sensor arrangement 10 captures a magnetic field using two sensors of the sensor arrangement and outputs corresponding first signals x and y which have a phase offset with respect to one another. In this case, in some implementations, the phase offset results from the arrangement of the sensors in the sensor arrangement 10. For example, as will be explained below with reference to FIGS. 2 and 3, these sensors may be arranged as a so-called "2D sensor" in order to capture magnetic field components in various directions. The signal x may then be representative of the measurement of a first magnetic field component in a first direction and y may be representative of the measurement of a second magnetic field component in a second direction that differs from the first direction. In this case, the first direction and the second direction may be orthogonal to one another. As will be explained, this may result in a phase offset of approximately 90° between the signal x and the signal y during use as a rotational angle sensor device.

The calculation apparatus 11 processes the first signals x and y and outputs at least three second signals a, b, c which have a phase offset with respect to one another. As will be explained further below, the second signals a, b, c may have a phase offset of in each case 120° with respect to one another, and can therefore be used to control a three-phase electric motor without the need for an arrangement containing three magnetic field sensors at different locations.

Figure 2:
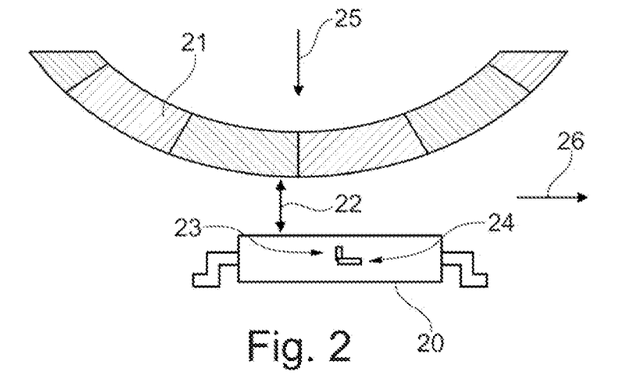
FIG. 2 is a sectional view of a rotational angle sensor device according to one example implementation.

FIG. 2 shows a rotational angle sensor device 20 according to a further example implementation. The rotational angle sensor device 20 has a first Hall sensor 23 and a second Hall sensor 24 which, as illustrated, are arranged at an angle of 90° with respect to one another in order to capture two magnetic field components of a magnetic field which are perpendicular to one another. Here, for example, the sensor 23 is a vertical Hall sensor, whereas the sensor 24 is a planar Hall sensor. The Hall field sensors 23, 24 are accommodated in a package. The calculation apparatus 11 from FIG. 1 may likewise be arranged in the package or may be provided externally in a further package, for example, in order to generate the second signals.

The Hall sensors 23, 24 of the rotational angle sensor device 20 capture the magnetic field from a magnet wheel 21 which has north and south poles in alternation and generates a modulated magnetic field during rotation. The magnet wheel 21 may be coupled, for example, to a rotor of an electric motor, as is explained later, in order to measure a rotational angle of the rotor and to then control the motor based on the measured rotational angle.

In this case, the sensor arrangement 20 is separated from the magnet wheel 21 by an air gap 22. As a result of the use of second sensors 23, 24 which are perpendicular to one another, the placement of the sensor arrangement 20 is relatively uncritical, for example also with respect to the size of the air gap 22. When the magnet wheel 21 rotates, the sensors 13, 14 provide two signals which have a phase offset of 90° with respect to one another in a manner corresponding to the first signals x and y in FIG. 1.

Instead of the magnet wheel 21, it is also possible to use, for example, a gearwheel made of a ferromagnetic material which modulates a magnetic field from a permanent magnet which may be arranged in the sensor arrangement 20, for example.

In addition, various placements of sensor arrangements relative to the magnet wheel 21 are possible. This is shown with reference to FIG. 3 comprising subFIGS. 3A-3D which illustrate various arrangements. In this case, FIGS. 3A and 3B each show a rotational angle sensor device 30 having a sensor arrangement of Hall sensors 33, 34 which are arranged at right angles to one another, but the surfaces of which are perpendicular to a main surface of the illustrated package of the rotational angle sensor device 30. The Hall sensors 33 and 34 may each be vertical Hall sensors in this case. The magnet wheel 21 may then be arranged relative to the sensor arrangement 30, as in FIG. 3A or FIG. 3B.

Figures 3A, 3B:
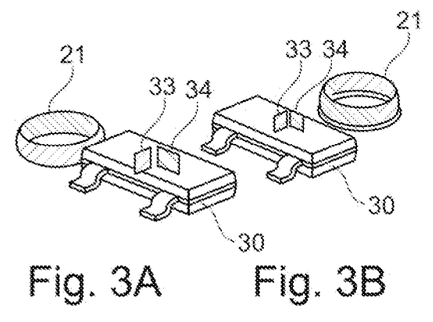
FIGS. 3A-3D show different examples for arranging rotational angle sensor devices according to various example implementations.
Figures 3C, 3D:
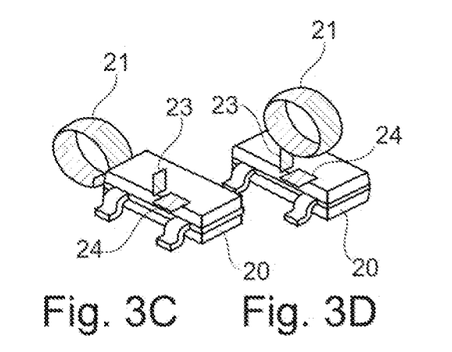

FIGS. 3C and 3D show possible arrangements of the magnet wheel 21 relative to the rotational angle sensor 20 from FIG. 2.

In all cases of FIGS. 3A to 3D, one of the sensors captures a magnetic field in a radial direction of the magnet wheel 21: the sensor 33 in FIG. 3A, the sensor 34 in FIG. 3B, the sensor 23 in FIG. 3C and the sensor 24 in FIG. 3D. The radial direction is indicated in FIG. 2 with an arrow 25. The respective other sensor, that is to say the sensor 34 in FIG. 3A, the sensor 33 in FIG. 3B, the sensor 24 in FIG. 3C and the sensor 23 in FIG. 3D, captures the magnetic field in a tangential direction of the magnet wheel 21, which is indicated in FIG. 2 with an arrow 26. This results in the two Hall sensors 23, 24 and 33, 34 outputting two signals which have a phase offset of 90° with respect to one another when the magnet wheel 21 rotates.

Figure 4:
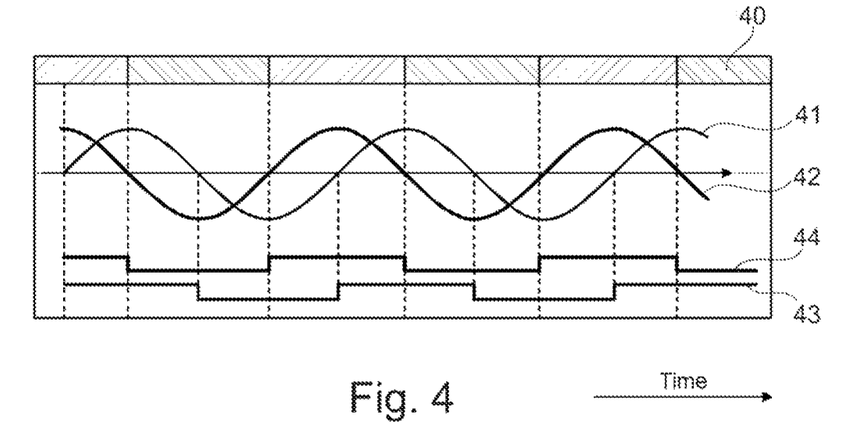
FIG. 4 shows example signals which are used in rotational angle sensor devices according to some example implementations.

This is schematically illustrated in FIG. 4. In this case, 40 shows a pole of the magnet wheel 21 which is closest to the sensor arrangement at the respective time. A curve 41 shows an output of one of the two Hall sensors used, which has a sinusoidal profile, and a curve 42 shows the profile of an output of the respective other Hall sensor, which exhibits a profile offset by 90° with respect thereto, that is to say a cosinusoidal profile. A curve 43 shows a digital signal which is obtained from the curve 41 and indicates the zero crossings of the signal 41, and a curve 44 shows a corresponding signal obtained from the curve 42.

Figure 5:
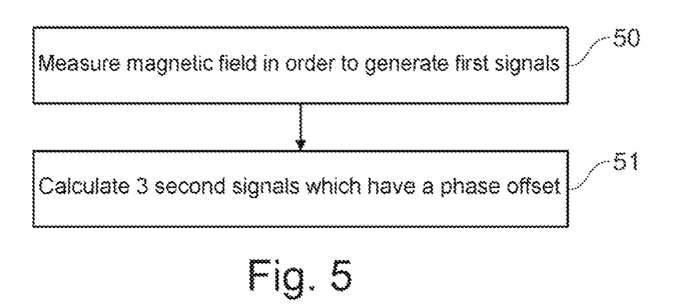
FIG. 5 shows a flowchart for illustrating methods according to some example implementations.

FIG. 5 shows a flowchart of a method according to some example implementations, which method can be carried out in the rotational angle sensor devices explained with reference to FIGS. 1 to 4. However, the method may also be implemented in other devices. In order to avoid repetitions, reference is made to the explanations given for FIGS. 1 to 4 when explaining FIG. 5.

At 50 in FIG. 5, the method comprises measuring a modulated magnetic field in order to generate two first signals which have a phase offset with respect to one another, in particular first signals which have a phase offset of 90° with respect to one another, for example the above signals x and y. At 51, the method comprises calculating at least three second signals, which have a phase offset with respect to one another, from the first signals, for example three second signals which have a phase offset of 120°.

The calculation of at least three signals which have a phase offset using the calculation apparatus 11 from FIG. 1 and at 51 in FIG. 5 is now explained in more detail with reference to FIGS. 5-9.

If, as illustrated in FIG. 4 for the signal 41, one first signal x substantially represents a sine function based on a rotational angle α and the other first signal y represents a cosinusoidal signal of the rotational angle α, that is to say x=sin(α) and y=cos(α) (in the case of an amplitude normalized to 1), signals a, b, c can be calculated according to the rules of trigonometry as follows:

$$a = \sin(\alpha) = x \qquad (1)$$

$$b = \sin(\alpha + 120°) = \sin(\alpha) \cdot \cos(120°) + \sin(120°) \cdot \cos(\alpha) = -\tfrac{1}{2} \cdot \sin(\alpha) + \tfrac{1}{2}\sqrt{3} \cdot \cos(\alpha) = -\tfrac{1}{2} \cdot (\sin(\alpha) - \sqrt{3} \cdot \cos(\alpha)) = -\tfrac{1}{2} \cdot (x - \sqrt{3}y) \qquad (2)$$

$$c = \sin(\alpha + 240°) = \sin(\alpha) \cdot \cos(240°) + \sin(240°) \cdot \cos(\alpha) = -\tfrac{1}{2} \cdot \sin(\alpha) - \tfrac{1}{2}\sqrt{3} \cdot \cos(\alpha) = -\tfrac{1}{2} \cdot (\sin(\alpha) + \sqrt{3} \cdot \cos(\alpha)) = -\tfrac{1}{2} \cdot (x + \sqrt{3}y) \qquad (3)$$

Three signals a, b and c which have a phase offset of 120° with respect to one another can therefore be calculated from the signals x and y generated, for example, by the sensor arrangement 10, for example by the calculation apparatus 11.

Figure 6:
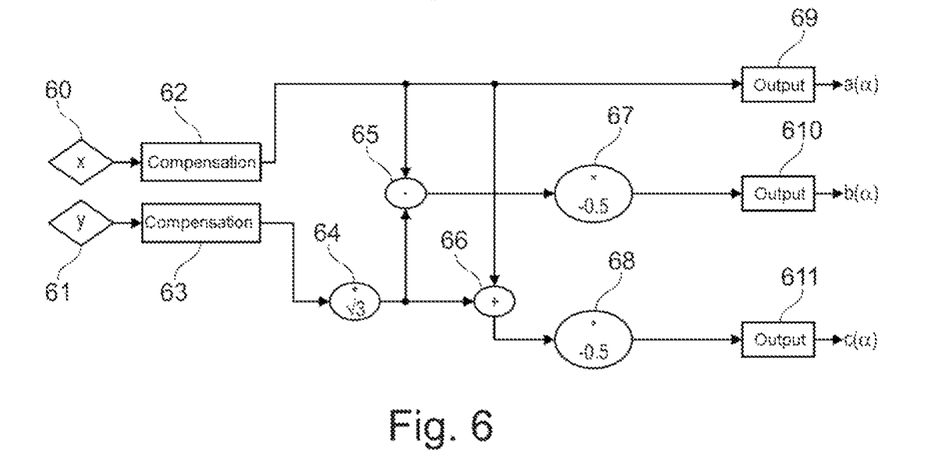
FIG. 6 shows a block diagram of an implementation example of a calculation apparatus of some example implementations.

In the above calculation, it is additionally taken into account in some implementations that the signals x and y, as are captured by the sensors 23 and 24 or 33 and 34, generally do not have the same amplitude. For the purposes of illustration, FIG. 6 shows a calculation apparatus which operates based on the above formulas, and FIGS. 7A-7D show example signals for illustrating the method of operation of the calculation apparatus from FIG. 6. The various components of FIG. 6 may be implemented as hardware logic, but may also be implemented in software, for example by programming a microcontroller.

Figure 7A:
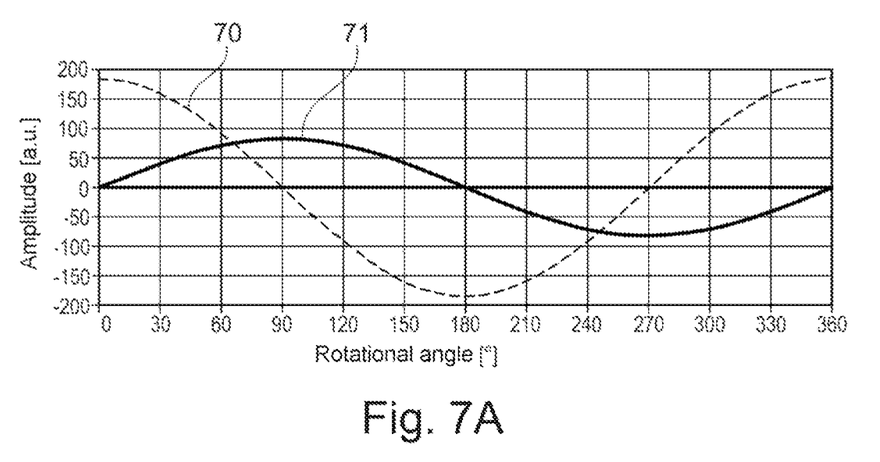
FIGS. 7A-7D show example signals for illustrating some example implementations.

The calculation in the calculation apparatus from FIG. 6 starts with the signal x at 60 and with the signal y at 61. In FIG. 7A, a curve 71 shows an example of the signal x, which follows a sinusoidal profile against the rotational angle, and a curve 70 shows an example of the signal y which follows a cosinusoidal profile against the rotational angle.

In the implementation illustrated, the signal 71 has a smaller amplitude than the signal 70. In order to adjust the amplitude, the signal x is supplied to a compensation block 62 and/or the signal y is supplied to a compensation block 63. With the compensation blocks 62, 63, the amplitude of the signal x can be adjusted to the amplitude of the signal y, the amplitude of the signal y can be adjusted to the amplitude of the signal x or both amplitudes can be set to a predetermined, identical value. For this purpose, the amplitudes of the signals x and y can be measured and the signals can then be amplified accordingly.

Figure 7B:
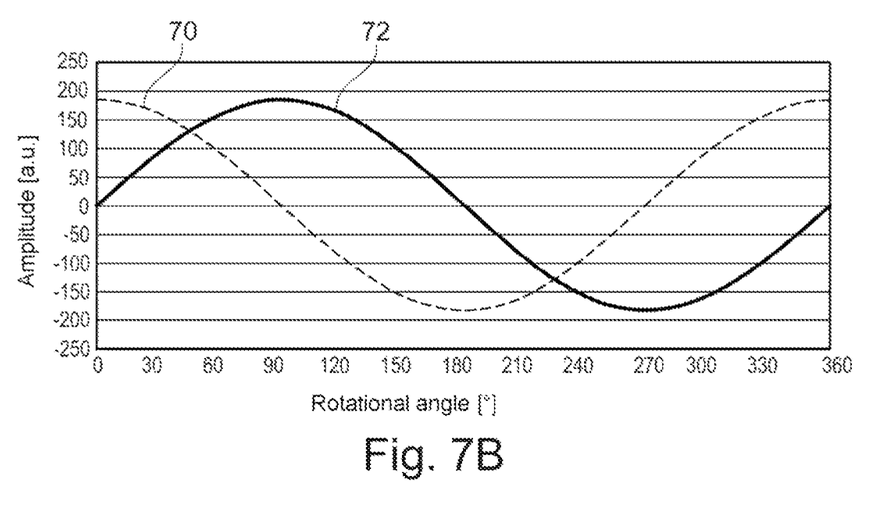

An example of the result of such an adjustment is illustrated in FIG. 7B. This in turn shows the signal 70 from FIG. 7A corresponding to the signal y from FIG. 6 and, as the signal 72, the signal 71 from FIG. 7A which has been multiplied by a factor of 2.4. In this manner, both signals 70, 72 have the same amplitude.

In order to implement the above formulas (1) to (3), the compensated signal y is then multiplied by √3 at 64, and the signal multiplied in this manner is subtracted from the compensated signal x at 65 and added to the compensated signal x at 66. At 67 and 68, a multiplication by −0.5 is carried out and, at 69, the signal a is then output based on the angle α, the signal b is output based on the angle α in the case of an output 610 and the signal c is output based on the angle α in the case of an output 611, wherein a corresponds to the compensated signal x, that is to say the sinusoidal signal, b has a phase offset of 120° in comparison with a and c has a phase offset of 240° in comparison with the signal a, as illustrated in the above formulas (1) to (3).

Figure 7C:
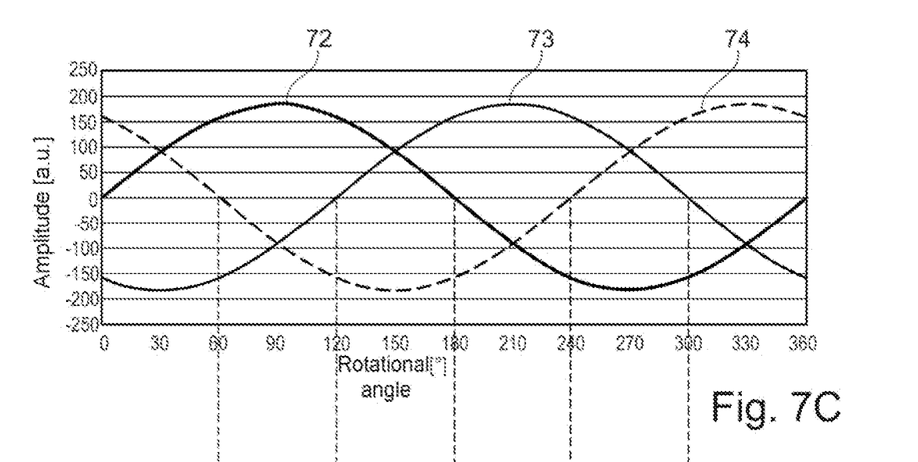
Figure 7D:
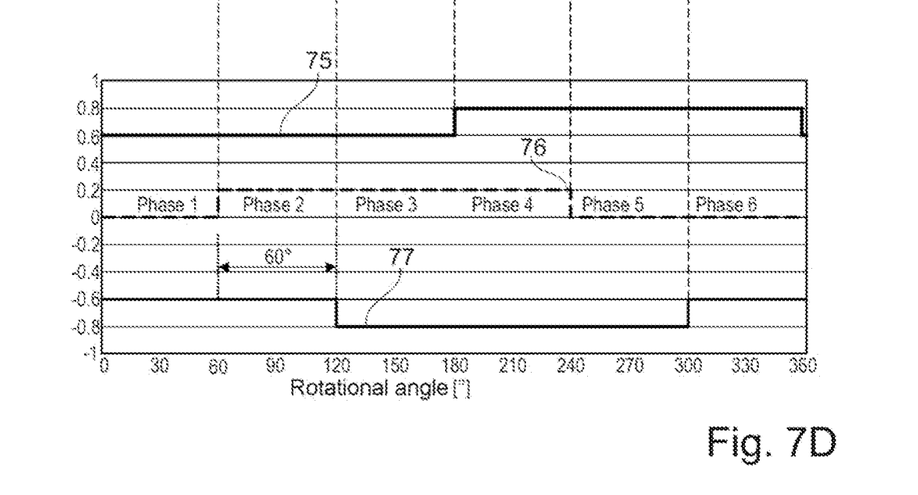

An example of resulting signals is illustrated in FIG. 7C, wherein the curve 72 from FIG. 7B then corresponds to the signal a, a curve 73 has a phase offset of 120° with respect thereto and corresponds to the signal b, and a curve 74 in turn has a phase offset of 120° with respect to the curve 72 and corresponds to the signal c. Digital signals which change their value at zero crossings can then be derived from these curves. As an example, FIG. 7D illustrates three signals 75, 76, 77 which have a phase offset with respect to one another and in which rising edges each have a phase offset of 120° with respect to one another. In this case, the signal 75 may be derived from the signal 72, the signal 77 may be derived from the signal 73, and the signal 76 may be derived from the signal 74, wherein the signals in FIG. 7D are inverted in comparison with FIG. 7C, that is to say positive signals in FIG. 7C correspond to low values of the signals in FIG. 7D. Since, in order to control an electric motor in example implementations, all zero crossings of the signals 72-74 corresponding to all edge changes of the signals 75-77 are used to control an electric motor, for example, this inversion does not have any effect and, depending on the apparatus used, can be used for conversion to digital signals. If rising and falling edges of the resulting signals 75, 76 and 77 are used, the result is a phase offset between successive edges of 60°, as indicated (rising edge of one signal to a falling edge of another signal), with the result that a total of six phases may be distinguished, for example for controlling an electric motor. For example, for each edge change of one of the signals 75, 76, 77 corresponding to a zero crossing of one of the signals 72, 73, 74, it is possible to carry out a switching operation for controlling the electric motor, for example in an inverter.

In the calculation apparatus from FIG. 6 and in the above formulas, the sinusoidal signal (for example signal 71 in FIG. 7A or signal 72 in FIG. 7B) is used as it were as a first signal with a phase angle of 0° (that is to say zero crossings at 0°, 180°, 360°), and the further signals with a phase offset of 120° and 240° with respect thereto are achieved in an offset manner with respect thereto. It is equally possible to start from the respective other, cosinusoidal signal (for example signal 70 in FIG. 7A) as the first signal d in order to generate signals e, f which are offset by 120° and 240°, respectively, with respect thereto according to the following formulas:

$$d = \cos(\alpha) = y \qquad (4)$$

$$e=\cos(\alpha+120°)=-\tfrac{1}{2}\cdot((\alpha)+\sqrt{3}\cdot\sin(\alpha))=-\tfrac{1}{2}\cdot(y+\sqrt{3}x) \quad (5)$$

$$f=\cos(\alpha+240°)=-\tfrac{1}{2}\cdot((\alpha)-\sqrt{3}\cdot\sin(\alpha))=-\tfrac{1}{2}\cdot(y-\sqrt{3}x) \quad (6),$$

in which case identical amplitudes of x and y are again presupposed here, which can be ensured using a correction block, as shown in FIG. 6. For the zero crossings, this would result in switching points at 30°, 90°, 150° etc. if used to control a motor.

A calculation apparatus for this may be constructed as shown in FIG. 6, substantially with interchanged signal inputs for the signals y and x.

Figure 8A:
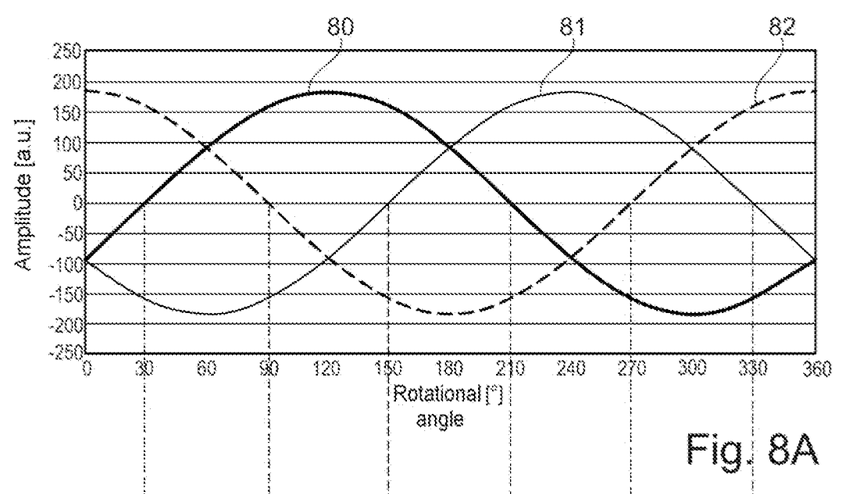
FIGS. 8A and 8B show example signals for illustrating further example implementations.
Figure 8B:
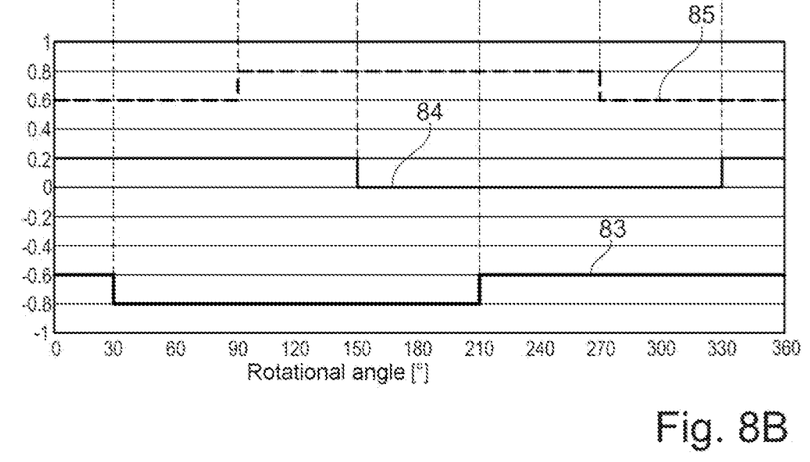

Examples of corresponding signals d-f are illustrated as curves 80 to 82 in FIG. 8A, and curves 83 to 85 in FIG. 8B show corresponding digital signals based on the zero crossings of the curves 80 to 82 in FIG. 8A.

Figure 9:
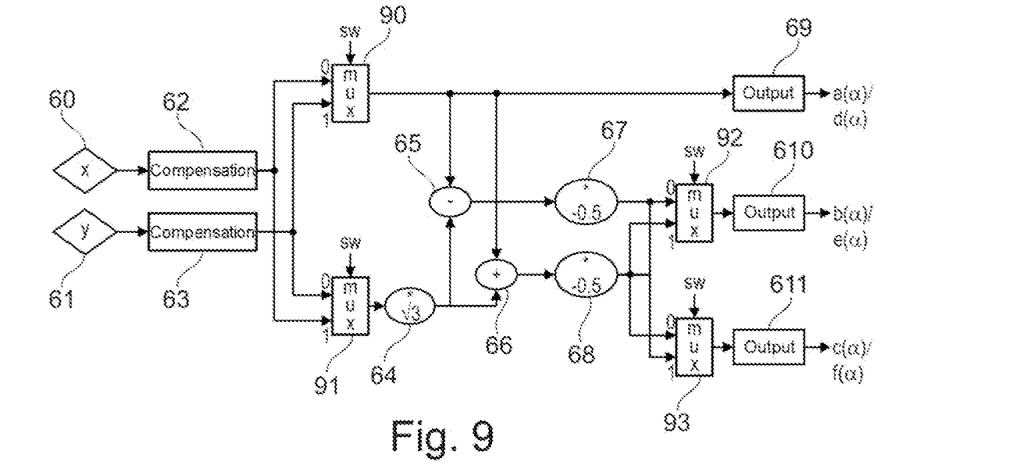
FIG. 9 is a block diagram of a calculation apparatus according to some example implementations.

In order to increase the flexibility, a calculation apparatus may also be configured to optionally carry out the two possible calculations. An example implementation of a corresponding calculation apparatus which can be used as the calculation apparatus 11 from FIG. 1 is illustrated in FIG. 9. The calculation apparatus in FIG. 9 is based on the calculation apparatus in FIG. 6, and identical elements have the same reference signs and are not explained again.

In addition to the elements in FIG. 6, the calculation apparatus in FIG. 9 has four multiplexers 90, 91, 92 and 93 which can be changed over based on a signal sw. In a position "0", that is to say if the inputs of the multiplexers that are denoted 0 are forwarded to the respective output, the calculation apparatus in FIG. 9 corresponds to that in FIG. 6, and the signals a($\alpha$), b($\alpha$) and c($\alpha$) are output. If the multiplexers 90 to 93 are changed over, with the result that the inputs "1" are forwarded, the signals x and y are substantially interchanged, and the output of the multipliers 67 and 68 is interchanged. In this case, the signals d($\alpha$), e($\alpha$) and f($\alpha$) are output at the outputs 69 to 611. In a further example implementation, the calculation apparatus may also be duplicated, with the result that all signals a ($\alpha$) to f ($\alpha$) are calculated and output at the same time. In other words, more than three signals with a phase offset can also be calculated based on the signals x and y.

It is likewise possible to calculate signals with other phase offsets by respectively using other offset angles in the above formulas. In addition, it is also not necessary for the input signals x and y to have a phase offset of 90° with respect to one another and to therefore correspond to sinusoidal and cosinusoidal signals. The calculation is also possible with phase offsets other than 90°; only the formulas then become somewhat more complicated. Since, however, as is clear from the above formulas, a signal having any desired phase offset can be calculated from a sinusoidal signal and a cosinusoidal signal, the cosinusoidal signal can naturally also be calculated, for example, from a sinusoidal signal and a signal which has an offset of 120° with respect to the latter, and the like.

Whereas the calculation in the calculation apparatus from FIGS. 6 and 9 is carried out using analog signals and there is possibly then a conversion to digital signals, as shown in FIGS. 7D and 8B, the calculation can also be carried out in other example implementations based on digital signals.

Therefore, use of a sensor arrangement having two sensors makes it possible to generate signals having any desired phase offset which can then be used to control a motor, for example.

Figure 10:
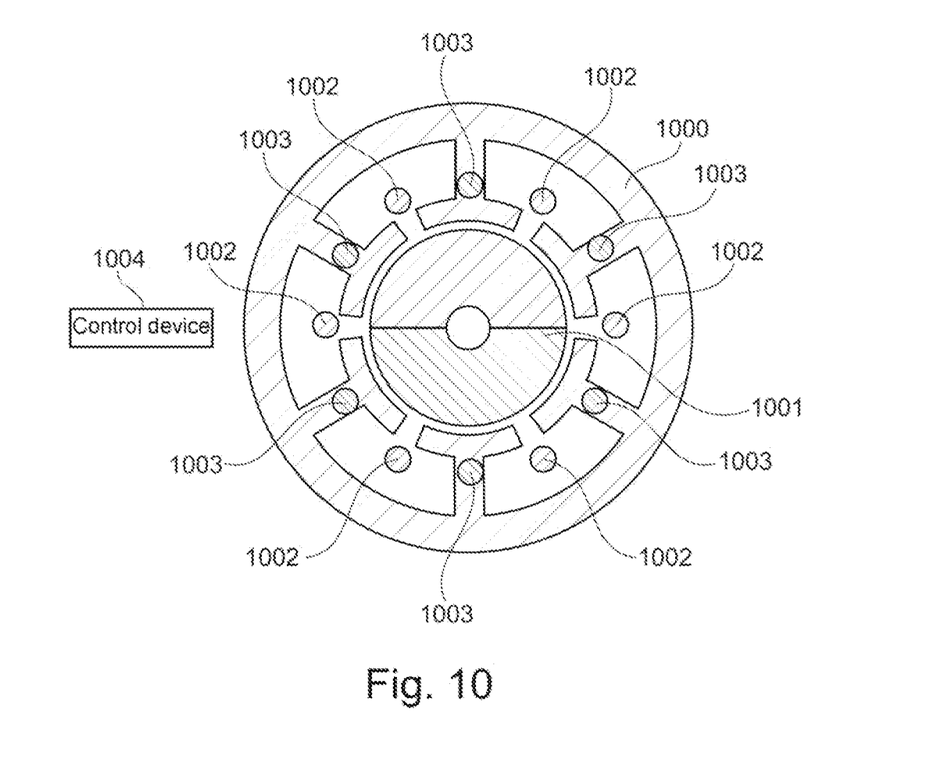
FIG. 10 shows examples of the placement of sensor arrangements according to example implementations in an electric motor.

Possible placements of a rotational angle sensor device or at least the sensor arrangement of the latter in the case of an electric motor are illustrated in FIG. 10. In this case, the electric motor has a stator 1000 with corresponding coils and a rotor 1001. The stator 1000 has a plurality of coils, through which current optionally flows using switches. Possible sensor locations are the locations 1002, substantially between coils, and the locations 1003, substantially coaxially with coils. In these positions, one of the sensors in the arrangements in FIGS. 3A-3D respectively generates the sinusoidal signal and the other sensor generates the cosinusoidal signal. The locations 1002 are offset by 30° with respect to the locations 1003. If the sensor arrangement is placed at one of the locations 1003, the above calculation of the signals a, b and c can be used and the electric motor can be controlled based on zero crossings of the signals a, b and c or based on edge changes of corresponding digital signals. If the sensor arrangement is placed at one of the locations 1002, the above calculation of the signals d, e and f can be used instead and the electric motor can be controlled based on zero crossings of the signals d, e and for based on edge changes of corresponding digital signals. In both cases, this then results in the same control of the electric motor since, on the one hand, as clear from FIGS. 7C and 7D on the one hand and from FIGS. 8A and 8B on the other hand, the zero crossings or edge changes of the signals d, e and f have an offset of 30° with respect to the signals a, b and c and, on the other hand, the positions are offset by 30°, with the result that the same switching times spaced apart by 60° result when using all zero crossings or edge changes of the respective three signals. A control device 1004 then controls the electric motor based on the signals a, b, c or d, e, f, in which case this control can be carried out in a manner known per se, for example by controlling power inverters based on the zero crossings or edge changes.

It should be noted that the calculation apparatus, by virtue of calculating the signals a, b, c and d, e, f as shown in FIG. 1, may be together with the sensor arrangement in a rotational angle sensor device, for example integrated in a chip or in a package. However, the calculation apparatus may also be integrated in the control device 1004, with the result that the control device 1004 receives the signals x, y discussed above from the sensor arrangement and then generates the signals a, b and c and d, e, f.

Positions other than the positions 1002, 1003 can also be used for a sensor arrangement since, as described above, the calculation can be accordingly adapted in order to obtain zero crossings or edge changes at the corresponding angular positions.

Figure 11:
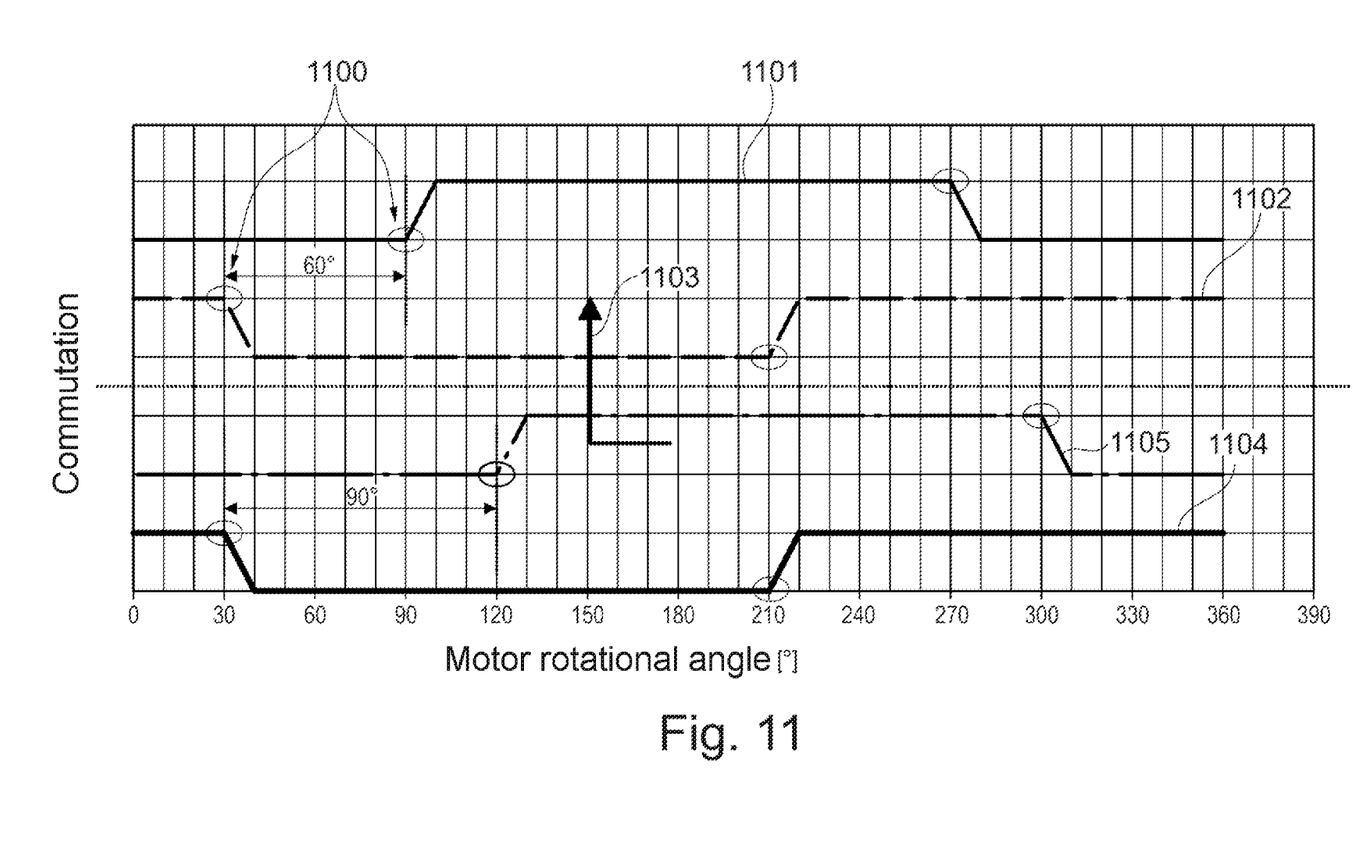
FIG. 11 shows example signals for illustrating the use of a rotational angle sensor device according to one example implementation in an electric motor.

FIG. 11 illustrates the control of such a motor with a rotational angle sensor device as described here. In this case, signals 1101, 1102, 1105 and 1104 are plotted against the motor rotational angle.

The signals 1104 and 1105 are based on signals which are generated by a sensor arrangement as described here which provides two signals which have a phase offset with respect to one another. They correspond, for example, to the signals 43 and 44 in FIG. 4. Signals which have a phase offset of 120° can then be generated therefrom as described, two of which are illustrated as signals 1101 and 1102. An arrow 1103 indicates the calculation by the calculation apparatus. The motor can then be commutated during rising and falling edges of the signals 1101 and 1102, as indicated by circles 1100. In this manner, only one sensor arrangement having two sensors, which measures to signals which have a phase offset, is needed to control the motor, and three Hall sensors need not be arranged at three different positions of the electric motor, for example.

ASPECTS

Some example implementations are defined by the following aspects:

Aspect 1. Rotational angle sensor device comprising:
a sensor arrangement which is configured to capture a temporally modulated magnetic field and, based on the temporally modulated magnetic field, to output at least two first signals which have a phase offset with respect to one another, and
a calculation apparatus which is configured to generate at least three second signals which have a phase offset with respect to one another based on the first signals.

Aspect 2. Rotational angle sensor device according to Aspect 1, wherein the two first signals have a phase offset of 90° with respect to one another.

Aspect 3. Rotational angle sensor device according to Aspect 1 or 2, wherein the at least three second signals comprise three signals which have a phase offset of 120° with respect to one another.

Aspect 4. Rotational angle sensor device according to one of Aspects 1 to 3, wherein the sensor arrangement comprises a first sensor for generating one of the first signals based on a magnetic field component of the modulated magnetic field in a first direction and a second sensor for generating another of the first signals based on a second magnetic field component of the modulated magnetic field in a second direction that differs from the first direction.

Aspect 5. Rotational angle sensor device according to Aspect 4, wherein the first direction is perpendicular to the second direction.

Aspect 6. Rotational angle sensor device according to one of Aspects 1 to 5, wherein the calculation apparatus is configured to change over between generating a first group of three signals of the at least three second signals, which have a phase offset with respect to one another, and generating a second group of another three signals of the at least three second signals, which have a phase offset with respect to one another, wherein the signals in the first group have a phase offset with respect to the signals in the second group.

Aspect 7. Device comprising:
an electric motor, and
the sensor device according to one of examples 1-6 for measuring the rotational angle of a rotor of the electric motor.

Aspect 8. Device according to Aspect 7, wherein the device also has a control device which is configured to control the electric motor based on zero crossings or edge changes of the at least three second signals.

Aspect 9. Method comprising:
capturing a temporally modulated magnetic field for the purpose of generating at least two first signals which have a phase offset with respect to one another, and
generating at least three second signals which have a phase offset with respect to one another based on the first signals.

Aspect 10. Method according to Aspect 9, wherein the first signals have a phase offset of 90° with respect to one another.

Aspect 11. Method according to Aspect 9 or 10, wherein the at least three second signals comprise three signals which have a phase offset of 120° with respect to one another.

Aspect 12. Method according to one of Aspects 9 to 11, wherein the generation of at least two first signals which have a phase offset with respect to one another comprises:
generating one of the first signals based on a magnetic field component of the modulated magnetic field in a first direction, and
generating another of the first signals based on a second magnetic field component of the modulated magnetic field in a second direction that differs from the first direction.

Aspect 13. Method according to Aspect 12, wherein the first direction is perpendicular to the second direction.

Aspect 14. Method according to one of Aspects 9 to 13, also comprising:
changing over between generating a first group of three signals of the at least three second signals, which have a phase offset with respect to one another, and generating a second group of another three signals of the at least three second signals, which have a phase offset with respect to one another, wherein the signals in the first group have a phase offset with respect to the signals in the second group.

Aspect 15. Method according to one of Aspects 9 to 14, also comprising: controlling an electric motor based on the at least three second signals.

Aspect 16. Device for controlling an electric motor, comprising:
a calculation apparatus which is configured to generate at least three second signals which have a phase offset with respect to one another based on two first signals which have a phase offset with respect to one another and are based on a magnetic field modulated by rotation of the electric motor,
wherein the device is configured to control the electric motor based on zero crossings or edge changes of the at least three second signals.

Aspect 17. Device according to Aspect 16, wherein the two first signals have a phase offset of 90° with respect to one another.

Aspect 18. Device according to Aspect 16 or 17, wherein the at least three second signals comprise three signals which have a phase offset of 120° with respect to one another.

Aspect 19. Device according to one of Aspects 16 to 18, wherein the calculation apparatus is configured to change over between generating a first group of three signals of the at least three second signals, which have a phase offset with respect to one another, and generating a second group of another three signals of the at least three second signals, which have a phase offset with respect to one another, wherein the signals in the first group have a phase offset with respect to the signals in the second group.

Although specific example implementations have been illustrated and described in this description, persons with conventional expert knowledge will recognize that a multiplicity of alternative and/or equivalent implementations can be selected as a substitution for the specific example implementations shown and described in this description without departing from the scope of the implementation shown. The intention is for this application to cover all adaptations or variations of the specific example implementations discussed here. Therefore, the intention is for this implementation to be restricted only by the claims and the equivalents of the claims.

What is claimed:

1. A rotational angle sensor device comprising:
a sensor arrangement which is configured to capture a temporally modulated magnetic field and, based on the temporally modulated magnetic field, to output at least two first signals which have a first phase offset with respect to one another, and
a calculation apparatus which is configured to generate at least three second signals which have a second phase offset with respect to one another based on the at least two first signals.

2. The rotational angle sensor device as claimed in claim 1, wherein the first phase offset of the at least two first signals is 90° with respect to one another.

3. The rotational angle sensor device as claimed in claim 1, wherein the at least three second signals comprise three second signals, wherein a phase offset of the three second signals is 120° with respect to one another.

4. The rotational angle sensor device as claimed in claim 1, wherein the sensor arrangement comprises a first sensor for generating one first signal of the at least two first signals based on a magnetic field component of the temporally modulated magnetic field in a first direction and a second sensor for generating another first signal of the at least two first signals based on a second magnetic field component of the temporally modulated magnetic field in a second direction that differs from the first direction.

5. The rotational angle sensor device as claimed in claim 4, wherein the first direction is perpendicular to the second direction.

6. The rotational angle sensor device as claimed in claim 1, wherein the calculation apparatus is configured to change over between generating a first group of three second signals of the at least three second signals, which have the second phase offset with respect to one another, and generating a second group of another three second signals of the at least three second signals, which have the second phase offset with respect to one another, wherein the three second signals in the first group have a phase offset with respect to the three second signals in the second group.

7. A device comprising:
an electric motor, and
a rotational angle sensor device for measuring a rotational angle of a rotor of the electric motor, the rotational angle sensor device comprising:
a sensor arrangement which is configured to capture a temporally modulated magnetic field and, based on the temporally modulated magnetic field, to output at least two first signals which have a first phase offset with respect to one another, and
a calculation apparatus which is configured to generate at least three second signals which have a second phase offset with respect to one another based on the at least two first signals.

8. The device as claimed in claim 7, wherein the device further comprises a control device which is configured to control the electric motor based on zero crossings or edge changes of the at least three second signals.

9. A method for generating signals for a rotational angle sensor device, the method comprising:
capturing a temporally modulated magnetic;
generating, based on capturing the temporally modulated magnetic field, at least two first signals which have a first phase offset with respect to one another; and
generating at least three second signals which have a second phase offset with respect to one another based on the at least first signals.

10. The method as claimed in claim 9, wherein the first phase offset of the at least two first signals is 90° with respect to one another.

11. The method as claimed in claim 9, wherein the at least three second signals comprise three second signals, wherein the second phase offset of the three second signals is 120° with respect to one another.

12. The method as claimed in claim 9, wherein generating the at least two first signals which have the first phase offset with respect to one another comprises:
generating a first signal of the at least two first signals based on a magnetic field component of the temporally modulated magnetic field in a first direction, and
generating another first signal of the at least two first signals based on a second magnetic field component of the temporally modulated magnetic field in a second direction that differs from the first direction.

13. The method as claimed in claim 12, wherein the first direction is perpendicular to the second direction.

14. The method as claimed in claim 9, further comprising:
changing over between generating a first group of three signals of the at least three second signals, which have a phase offset with respect to one another, and generating a second group of another three signals of the at least three second signals, which have a phase offset with respect to one another, wherein the three signals in the first group have a phase offset with respect to the three signals in the second group.

15. The method as claimed in claim 9, further comprising:
controlling an electric motor based on the at least three second signals.

16. A device for controlling an electric motor, comprising:
a calculation apparatus which is configured to generate at least three second signals which have a first phase offset with respect to one another based on two first signals which have a second phase offset with respect to one another and are based on a magnetic field modulated by a rotation of the electric motor,
wherein the device is configured to control the electric motor based on zero crossings or edge changes of the at least three second signals.

17. The device as claimed in claim 16, wherein the second phase offset of the two first signals is 90° with respect to one another.

18. The device as claimed in claim 16, wherein the at least three second signals comprise three signals, wherein the first phase offset of the three signals is 120° with respect to one another.

19. The device as claimed in claim 16, wherein the calculation apparatus is configured to change over between generating a first group of three signals of the at least three second signals, which have the first phase offset with respect to one another, and generating a second group of another three signals of the at least three second signals, which have the first phase offset with respect to one another, wherein the three signals of the at least three second signals in the first group have a third phase offset with respect to the other three signals of the at least three second signals in the second group.

* * * * *

UNITED STATES PATENT AND TRADEMARK OFFICE
CERTIFICATE OF CORRECTION

| | |
|---|---|
| PATENT NO. | : 12,050,103 B2 |
| APPLICATION NO. | : 17/653671 |
| DATED | : July 30, 2024 |
| INVENTOR(S) | : Rainer Kling et al. |

It is certified that error appears in the above-identified patent and that said Letters Patent is hereby corrected as shown below:

In the Claims

Claim 9:
Column 11, Line 50 change "capturing a temporally modulated magnetic" to --capturing a temporally modulated magnetic field--

Signed and Sealed this
Sixteenth Day of September, 2025

Coke Morgan Stewart
*Acting Director of the United States Patent and Trademark Office*